United States Patent
Alarifi et al.

(10) Patent No.: US 10,440,008 B2
(45) Date of Patent: Oct. 8, 2019

(54) METHOD AND SYSTEM FOR DYNAMICALLY GENERATING A HINT TO RECALL A PASSWORD FOR A USER ACCOUNT OF A USER

(71) Applicant: The King Abdulaziz City for Science and Technology, Riyadh (SA)

(72) Inventors: Abdulrahman Saad Alarifi, Riyadh (SA); Mansour Abdulrahman Alsaleh, Riyadh (SA); Noura Nassir Alomar, Riyadh (SA)

(73) Assignee: THE KING ABDULAZIZ CITY FOR SCIENCE AND TECHNOLOGY, Riyadh (SA)

( * ) Notice: Subject to any disclaimer, the term of this patent is extended or adjusted under 35 U.S.C. 154(b) by 49 days.

(21) Appl. No.: 15/258,826

(22) Filed: Sep. 7, 2016

(65) Prior Publication Data
US 2018/0069843 A1 Mar. 8, 2018

(51) Int. Cl.
G06F 21/46 (2013.01)
G06F 21/45 (2013.01)
H04L 29/06 (2006.01)
G06F 21/31 (2013.01)
H04L 9/32 (2006.01)
G06F 17/30 (2006.01)

(52) U.S. Cl.
CPC .......... H04L 63/083 (2013.01); G06F 21/31 (2013.01); H04L 9/3226 (2013.01); H04L 9/3239 (2013.01)

(58) Field of Classification Search
None
See application file for complete search history.

(56) References Cited

U.S. PATENT DOCUMENTS

| | | | |
|---|---|---|---|
| 9,021,269 B2 * | 4/2015 | Spilman | G06F 21/602 713/168 |
| 9,230,092 B1 * | 1/2016 | Juels | H04L 63/083 |
| 2013/0031372 A1 * | 1/2013 | Oltmans | G06F 17/30091 713/189 |

FOREIGN PATENT DOCUMENTS

WO WO-0113572 A1 * 2/2001 .......... H04L 9/0863

OTHER PUBLICATIONS

Honeywords: Making Password-Cracking Detectable. Juels et al. ACM. (Year: 2013).*
WO 2001/13572 A1. Visto Corporation. (Year: 2001).*

* cited by examiner

*Primary Examiner* — Venkat Perungavoor
(74) *Attorney, Agent, or Firm* — Steven M. Shape; Dennemeyer & Associates, LLC

(57) ABSTRACT

The invention provides a method and system for dynamically generating a hint to recall a password for a user account of a user. The method for dynamically generating the hint to recall the password for the user account of the user includes the steps of receiving the password for the user account while the user inputs the password field of a login page. The password comprises a plurality of characters. The method, then, converts the password from the plain text to a hash value using a hash function. Thereafter, the method performs a modulo operation on the hash value to obtain an index pointing an object within an object library associated with the user. The method, then, displays the object as the hint. The hint enables the user to create a mental association between the password and the object for the user account.

19 Claims, 4 Drawing Sheets

US 10,440,008 B2

METHOD AND SYSTEM FOR DYNAMICALLY GENERATING A HINT TO RECALL A PASSWORD FOR A USER ACCOUNT OF A USER

FIELD OF THE INVENTION

The invention generally relates to a field of providing a hint to recall a password for a user account of a user. More specifically, the invention relates to a method and system for dynamically generating a hint to recall a password for a user account of a user.

BACKGROUND OF THE INVENTION

Authentication is a basic requirement for many services. Authentication systems utilize passwords as an authentication mechanism to provide access approval for a user to access user accounts. The passwords include a string of characters. The user tends to choose a unique and strong password for the user accounts in accordance with password strength and security and usability tradeoffs. If the user is associated with multiple user accounts, then the user may face difficulty in managing the multiple user accounts because of memory related issues. In order to enable the user to manage multiple user accounts, the authentication systems provide password hints associated with the passwords for the multiple user accounts.

In order to provide the password hints, existing authentication systems allows the user to select a text that includes a word or a sentence or to input answers for certain questions at a time of creation of a particular user account. When the user forgets the password for the particular user account, the authentication system provides the text selected by the user or answers inputted by the user as the password hints for the particular user account.

However, the existing authentication systems either ask users to formulate the password hints or store the password hints for lateral retrieval. Thus, results in human errors, social engineering attacks and compromising password hint files or databases. If the text selected or answers provided by the user includes more information, then the password hints are more vulnerable to guessability, dictionary attacks and brute force attacks.

Also, the existing authentication systems do not generate the password hints dynamically to assist the user to verify the correctness of the passwords associated with the user account before submitting login credentials.

Therefore, in light of the above mentioned prior art, there is a need for a method and system for generating a hint to recall a password for a user account of a user.

BRIEF DESCRIPTION OF THE FIGURES

The accompanying figures where like reference numerals refer to identical or functionally similar elements throughout the separate views and which together with the detailed description below are incorporated in and form part of the specification, serve to further illustrate various embodiments and to explain various principles and advantages all in accordance with the invention.

Figure 1:
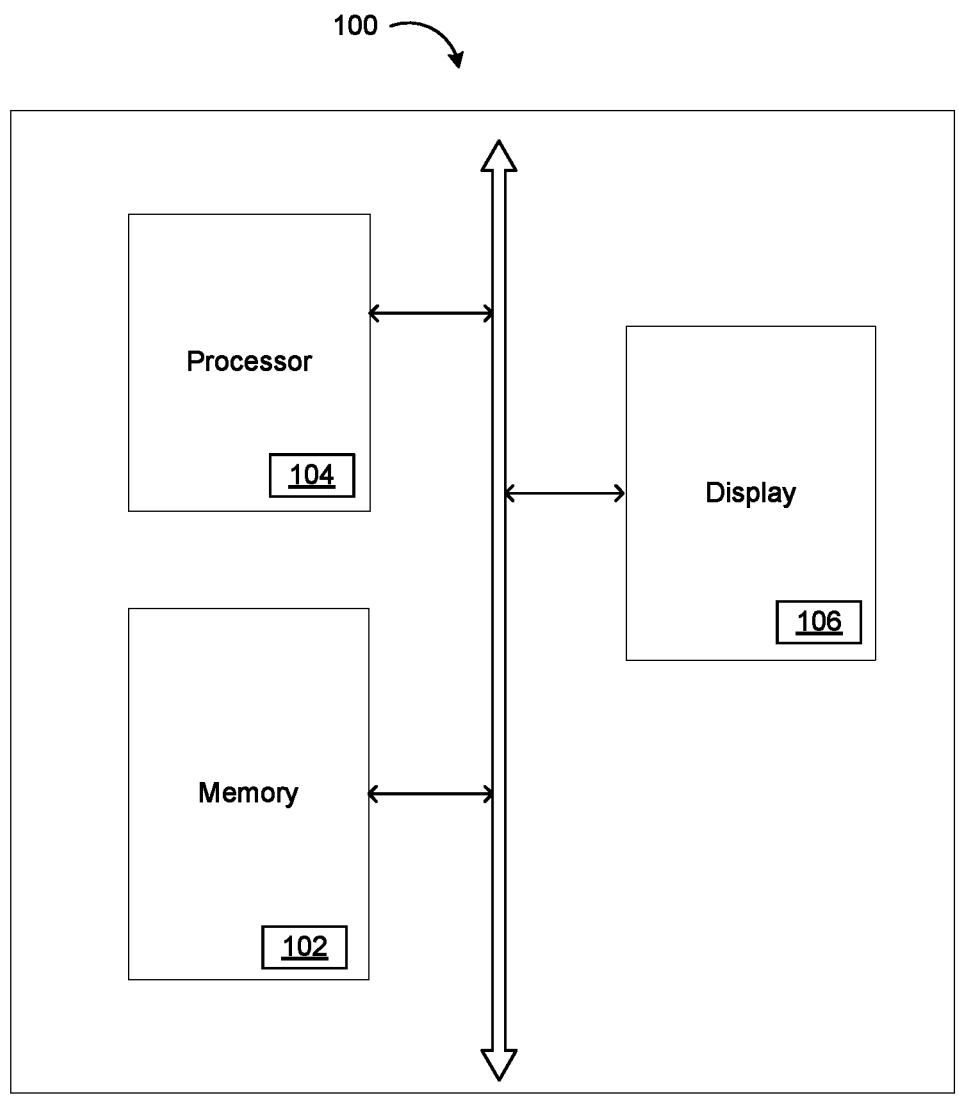
FIG. 1 illustrates a system for dynamically generating a hint to recall a password for a user account of a user in accordance with an embodiment of the invention.

Skilled artisans will appreciate that elements in the figures are illustrated for simplicity and clarity and have not necessarily been drawn to scale. For example, the dimensions of some of the elements in the figures may be exaggerated relative to other elements to help to improve understanding of embodiments of the invention.

DETAILED DESCRIPTION OF THE INVENTION

Before describing in detail embodiments that are in accordance with the invention, it should be observed that the embodiments reside primarily in combinations of method steps and system components related to dynamically generating a hint to recall a password for a user account and enabling the user to create a mental association between the password and an object used as the hint for the user account.

Accordingly, the system components and method steps have been represented where appropriate by conventional symbols in the drawings, showing only those specific details that are pertinent to understanding the embodiments of the invention so as not to obscure the disclosure with details that will be readily apparent to those of ordinary skill in the art having the benefit of the description herein.

In this document, relational terms such as first and second, top and bottom, and the like may be used solely to distinguish one entity or action from another entity or action without necessarily requiring or implying any actual such relationship or order between such entities or actions. The terms "comprises," "comprising," or any other variation thereof, are intended to cover a non-exclusive inclusion, such that a process, method, article or composition that comprises a list of elements does not include only those elements but may include other elements not expressly listed or inherent to such process, method, article or composition. An element proceeded by "comprises . . . a" does not, without more constraints, preclude the existence of additional identical elements in the process, method, article or composition that comprises the element.

Various embodiments of the invention provide a method and system for dynamically generating a hint to recall a password for a user account of a user. The method for dynamically generating the hint to recall the password for the user account of the user includes the steps of receiving the password for the user account while the user inputs the password field of a login page. The password comprises a plurality of characters. The method, then, converts the password from the plain text to a hash value. A hash function is used to convert the password from the plain text to the hash value. Thereafter, the method performs a modulo operation on the hash value to obtain an index pointing an object within an object library associated with the user. The method, then, displays the object as the hint. The hint enables the user to create a mental association between the password and the object for the user account.

FIG. 1 illustrates a system 100 for dynamically generating a hint to recall a password for a user account of a user in accordance with an embodiment of the invention.

As illustrated in FIG. 1, system 100 includes a memory 102 and a processor 104 communicatively coupled to memory 102. Processor 104 receives the password for the user account while the user inputs the password in a password field of a login page. The password comprises a plurality of characters. The plurality of characters includes, but not limited to, letters, numerical digits, symbols, punctuation marks and white space.

By receiving the password, processor 104 converts the password from a plain text to a hash value using a hash function. The hash function is a one-way cryptographic function. Thus, the password cannot be generated by the hash value in a reverse manner. In one embodiment, a SHA-3 hash function or a SHA-2 hash function is used to convert the password from the plain text to the hash value.

Processor 104 performs a modulo operation on the hash value to obtain an index pointing to an object within an object library associated with the user. The index is a number selected which ranges from '1' to 'n' and 'n' represents a size of the object library. The modulo operation further converts the hash value into smaller values in accordance with a size of the object library. Further, the modulo operation supports masking of the hash value to avoid feasibility of reversing mechanisms of the hash function.

The object library includes, but not limited to a contact list and an image library. The object within the object library can be, but not limited to a contact name, a contact image, a contact number, an email address and an image. In one embodiment, the object library is located on the server. In another embodiment, the object library is located on a user device. The user device can be, but not limited to a mobile device, a personal digital assistant, a computer, a laptop, a smart phone and a tablet. Further, processor 104 obtains permission from the user to access the object library associated with the user.

The object associated with the index that is determined by processor 104 is fed into a display 106. Display 106 communicatively coupled to both memory 102 and processor 104 displays the object as the hint in accordance with a real time mapping between the index obtained for the hash value and the object within the object library. The hint enables the user to create a mental association between the password and the object for the user account. Display 106 displays the hint after receiving a predetermined number of characters of the password.

Displaying the object as the hint by display 106 includes, but not limited to displaying a full contact information associated with the user's contact and displaying a portion of a contact information associated with the user's contact.

Display 106 provides a same hint for a same password on multiple user devices as the object library is usually synchronized and accessible across the multiple user devices. Thus, the hint enables the user to confirm the correctness of passwords for the user account before receiving a response from a service provider of the particular service associated with the user account of the user.

Moving on, processor 104 further uses an enroll list to keep track of the object within the object library for a first time generation of a hint for a new password.

Processor 104 determines a user name and a service provider ID associated with the user account of the user for first time generation of a hint for the new password. Then, processor 104 inserts the username and the service provider ID into enroll list to keep track of the object within the object library. The service provider ID is a uniform resource locator (URL) that represents an identification number for the service in which the password is created for the user account.

Processor 104 further updates an index of the object within the object library. Processor 104 creates a new index for a new object added to the object library. The new index is created at an end of the object library for the new object. Thus, at a time of insertion of a new object, the new object may not be associated with a hint generated for a user account of a user. The new index is not used by processor 104 to generate the hint for previously used passwords for the user account.

Processor 104 tags an index of a deleted object within the object library as a deleted entry. Processor 104 keeps the index of the deleted object unused to avoid shifting of the index of the object within the object library. The index of the deleted object is used by processor 104 to generate the hint for the previously used passwords for the user account and the index of the deleted object is not used for a generation of the hint for new passwords.

Processor 104 sends a notification message to the user when an object within the object library is altered. The notification message may not include information about the hint associated with an altered object that is used for the previously used passwords for the user account. By receiving an alter request from the user in response to the notification message, processor 104 alters an index of the altered object.

Figure 2:
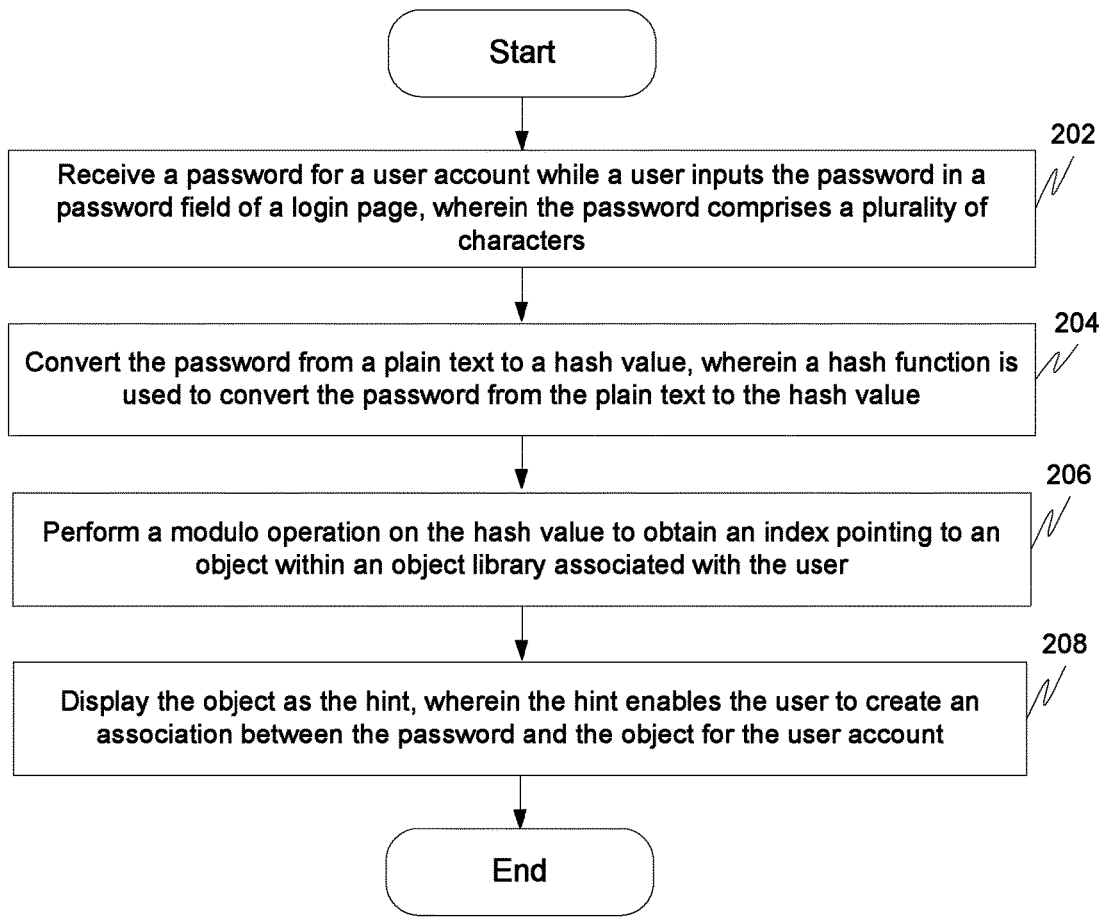
FIG. 2 illustrates a flowchart of a method for dynamically generating a hint to recall a password for a user account of a user in accordance with an embodiment of the invention.

FIG. 2 illustrates a flowchart of a method for dynamically generating a hint to recall a password for a user account of a user in accordance with an embodiment of the invention.

At step 202, the password for the user account of the user is received using processor 104 while the user types the password in a password field of a login page. The password comprises a plurality of characters.

Once the password is received, at step 204, the password is converted from a plain text to a hash value using processor 104. The password is converted from the plain text to the hash value using a hash function.

At step 206, a modulo operation is then performed on the hash value using processor 104 to obtain an index pointing to an object within an object library associated with the user.

Thereafter, at step 208, the object as the hint is displayed using display 106. The hint enables the user to create a mental association between the password and the object for the user account.

Figure 3:
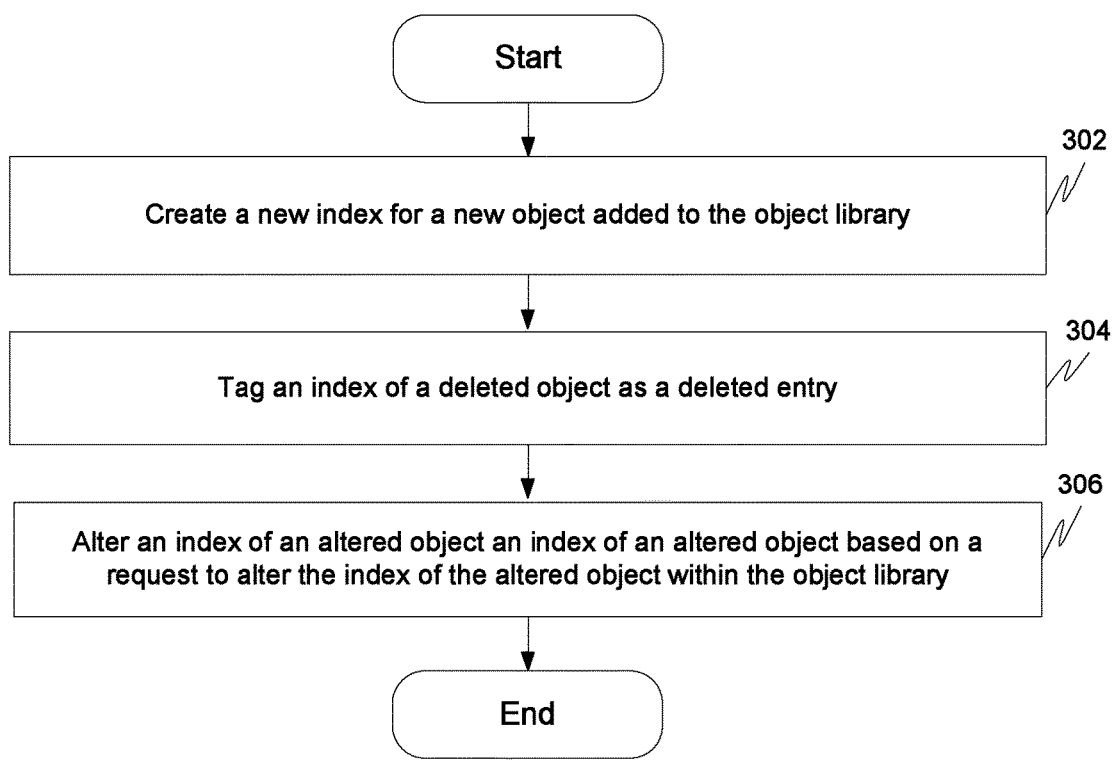
FIG. 3 illustrates a flowchart of a method for updating an index of an object within an object library in accordance with an embodiment of the invention.

FIG. 3 illustrates a flowchart of a method for updating an index of an object within an object library in accordance with an embodiment of the invention.

At step 302, a new index is created for a new object using processor 104, when the new object is added to the object library.

When an object within the object library is deleted, at step 304, an index of deleted object is tagged as a deleted entry using processor 104.

When an object within the object library is altered, at step 306, an index of an altered object is altered using processor 104 based on a request to alter the index of the altered object within the object library.

In accordance with an exemplary embodiment of the invention, a user creates a password as "ABCD123" for a user account 1. Thereafter, when the user types the password for the user account 1, the password is received by processor 104 while the user inputs the password in a password field of a login page.

Then, a plain text associated with the password "ABCD123" is converted to a hash value using the hash function by processor 104. By obtaining the hash value, a modulo operation is performed on the hash value to determine an index by processor 104. The index determined for the password "ABCD123" may be four.

Thereafter, real time mapping is performed between the index obtained for the hash value and the object within the object library by processor 104. In an example, the object is a contact name and the object library is a contact list associated with the user.

As the index determined for the password "ABCD123" is four, a fourth contact name in the contact list is selected by the processor 104 as a hint. The fourth contact name may be "XYZ". The fourth contact name "XYZ" may be displayed as the hint using display 106 for the password "ABCD123". The hint "XYZ" is dynamically generated and displayed for the password "ABCD123" after receiving a last character of the password "ABCD123".

Whenever the user enters the password "ABCD123" for the user account 1, the hint "XYZ" is displayed, because an index determined by performing modulo operations on the hash value of the password "ABCD123" remains same. Thus, the hint enables the user to create a mental association between the contact name "XYZ" and the password "ABCD123" for the user account 1.

When the user types a password "dcb321" that is other than the password "ABCD123" for the user account 1, a hint "PQR" (contact name) is displayed based on an index determined for the password "dcb321". Thus, the hint other than "XYZ" enables the user to infer that the password entered is wrong as the user has never created a mental association between the hint "PQR" and the password "ABCD123" for the user account 1.

Figure 4:
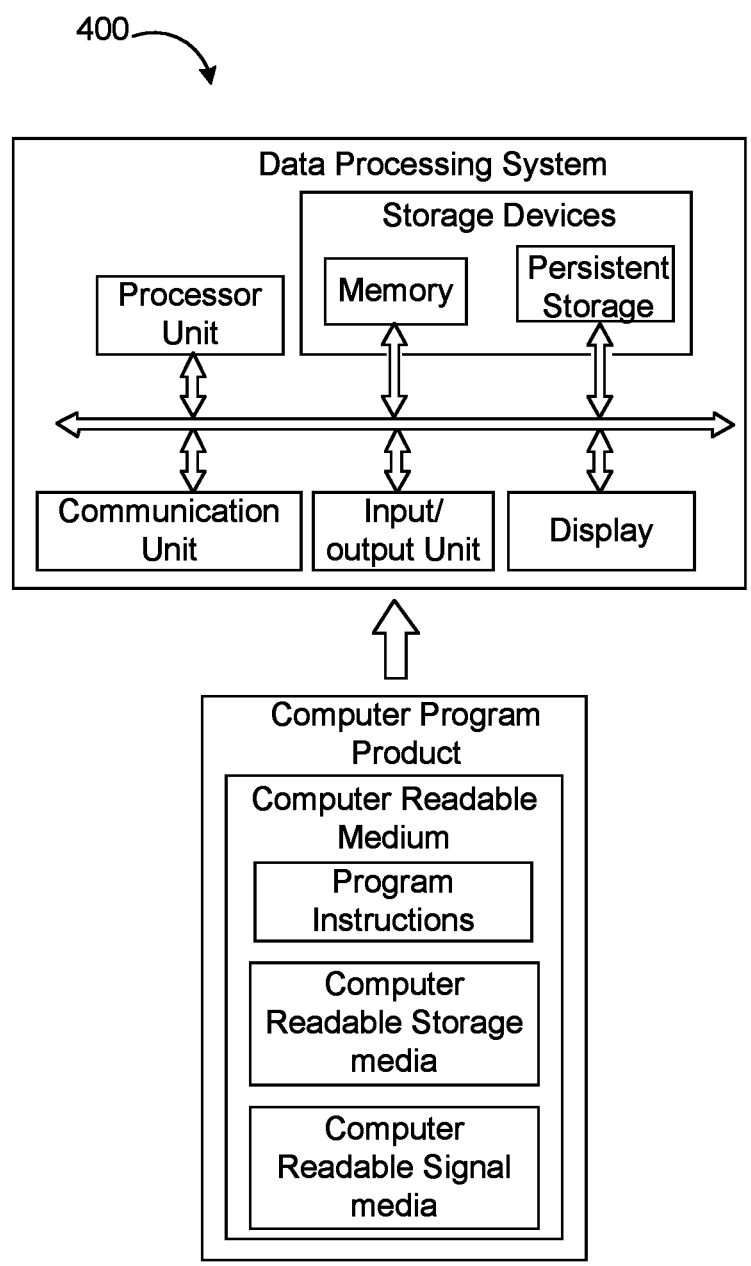
FIG. 4 illustrates a computer program product for dynamically generating a hint to recall a password for a user account of a user in accordance with an embodiment of the invention.

FIG. 4 illustrates a computer program product 400 for dynamically generating a hint to recall a password for a user account of a user in accordance with an embodiment of the invention.

An embodiment of the present invention may relate to a computer program product with a non-transitory computer readable medium having program instructions thereon for performing various computer-implemented operations of the method and/or system disclosed herein. The computer readable storage media and program instructions may be those specially designed and constructed for the purposes of the method and/or system disclosed herein, or, they may be of the kind well known and available to those having skill in the computer software arts. Examples of computer readable storage media include, but are not limited to, magnetic media, optical media, magneto-optical media and hardware devices that are specially configured to store and execute program instructions. Examples of program instructions include machine code, such as produced by a compiler, and files containing higher-level code that are executed by a computer using an interpreter. For example, an embodiment of the present invention may be implemented using JAVA®, C++, or other object-oriented programming language and development tools. Aspects of the present invention may also be implemented using Hypertext Transport Protocol (HTTP), Procedural Scripting Languages and the like.

The present invention aids in retrieval of password from human memory by presenting unique hint for a user account while a user types the password. A real time mapping of the password and a hint occurs each time when the user types the password in a password field of the login page. The hint is dynamically generated by receiving predetermined number of characters of the password. The hint is generated to recall the password for the user account without storing any information such as but not limited to, the passwords, account details, look up tables, mapping data between passwords and corresponding hints and text selected by the user at a time of creation of the user account. Further, generation of the hint for the user account does not require any modifications to authentication systems and any additional set up or registration steps for a new user account.

The object within the object library is displayed as the hint that enables the user to create a mental association between the password and the object for a long term. A strong tie between the password and the object developed in a memory of the user increases a frequency of successful logins without revealing any information about the password in question.

The real time mapping of the password and the object provides more security guarantees by preventing attackers from gaining access to user devices to access the password and the object provided as the hint for the password. Further, the invention is resistant against stealth attacks as the attackers may be able to only link the hint generated with a username associated with the user account that may not help the attackers to guess the password associated with the hint. As the hint reveals no information about the password in question, shoulder surfing may be mitigated.

Also, a modulo operations performed on a hash value of the passwords using one-way cryptographic hash function makes the invention resistant against dictionary attacks as the hint is associated with a large number of dictionary words relative to the hash value in which the probability of two passwords hashed to same value is almost zero. Additionally, only the object within the object library is used as the hint. Thus, other data from the user devices may not be helpful for attackers to perform a root attack.

Those skilled in the art will realize that the above recognized advantages and other advantages described herein are merely exemplary and are not meant to be a complete rendering of all of the advantages of the various embodiments of the invention.

The system, as described in the invention or any of its components may be embodied in the form of a computing device. The computing device can be, for example, but not limited to, a general-purpose computer, a programmed microprocessor, a micro-controller, a peripheral integrated circuit element, and other devices or arrangements of devices, which are capable of implementing the steps that constitute the method of the invention. The computing device includes a processor, a memory, a nonvolatile data storage, a display, and a user interface.

In the foregoing specification, specific embodiments of the invention have been described. However, one of ordinary skill in the art appreciates that various modifications and changes can be made without departing from the scope of the invention as set forth in the claims below. Accordingly, the specification and figures are to be regarded in an illustrative rather than a restrictive sense, and all such modifications are intended to be included within the scope of the invention. The benefits, advantages, solutions to problems, and any element(s) that may cause any benefit, advantage, or solution to occur or become more pronounced are not to be construed as a critical, required, or essential features or elements of any or all the claims. The invention is defined solely by the appended claims including any amendments made during the pendency of this application and all equivalents of those claims as issued.

What is claimed is:

1. A method for dynamically generating a hint to recall a password for a user account of a user, the method comprising:

receiving the password by a processor for the user account while the user inputs the password in a password field of a login page, wherein the password comprises a plurality of characters;

converting the password by a processor from a plain text to a hash value, wherein a hash function is used to convert the password from the plain text to the hash value;

performing a modulo operation on the hash value by a processor to obtain an index pointing to an object within an object library associated with the user, wherein the object library is one of a contact list and an image library, and wherein the object in the object library is at least one of a contact name, a contact image, a contact number, an email address and an image; and displaying the object by a processor in real time as the hint in accordance with a real time mapping between the index obtained for the hash value and the object within the object library, wherein the hint enables the user to create a mental association between the password and the object for the user account.

2. The method according to claim 1, wherein the hash function is a one way cryptographic function.

3. The method according to claim 1, wherein the modulo operation converts the hash value into a plurality of smaller values in accordance with a size of the object library.

4. The method according to claim 1, wherein an index is a number selected which ranges from '1' to 'n', wherein 'n' represents a size of the object library.

5. The method according to claim 1, wherein the object library is located on a server.

6. The method according to claim 1, wherein the object library is located on a user device.

7. The method according to claim 1, wherein a permission from the user is obtained, by one or more processors, to access the object library associated with the user.

8. The method according to claim 1, wherein the hint is dynamically generated, by one or more processors, after receiving a predetermined number of characters of the password.

9. The method according to claim 1, wherein the hint enables the user to confirm a correctness of the password for the user account before receiving a response from a service provider of the user account.

10. The method according to claim 1, wherein displaying the object as the hint includes displaying at least one of a contact name, a contact image, a contact number, an email address and an image associated with the object.

11. The method according to claim 1, further comprising inserting a username for the user account and a service provider ID by the processor for the user account in an enrolled list.

12. The method according to claim 11, wherein the enrolled list is used by the processor for a first time generation of a hint for a new password.

13. The method according to claim 1, further comprising;
creating a new index by a processor for a new object added to the object library;
tagging an index of a deleted object by a processor as a deleted entry; and
altering an index of an altered object by a processor based on a request to alter the index of the altered object within the object library.

14. A system for dynamically generating a hint to recall a password for a user account of a user, the system comprising:

a memory;
a processor communicatively coupled to the memory, wherein the processor:
receives the password for the user account while the user inputs the password in a password field of a login page, wherein the password comprises a plurality of characters;
converts the password from a plain text to a hash value, wherein a hash function is used to convert the password from the plain text to the hash value;
performs a modulo operation on the hash value to obtain an index pointing to an object within an object library associated with the user, wherein the object library is one of a contact list and an image library, and wherein the object in the object library is at least one of a contact name, a contact image, a contact number, an email address and an image; and
a display to display the object in real time as the hint in accordance with a real time mapping between the index obtained for the hash value and the object within the object library, wherein the hint enables the user to create an association between the password and the object for the user account.

15. The system according to claim 14, wherein the processor inserts a username for the user account and a service provider ID for the user account in an enrolled list.

16. The system according to claim 14, wherein the processor:
creates a new index for a new object added to the object library;
tags an index of a deleted object as a deleted entry; and
alters an index of an altered object based on a request to alter the index of the altered object within the object library.

17. A computer program product for dynamically generating a hint to recall a password for a user account of a user, the computer program product comprising a non-transitory computer readable medium having program instructions stored therein, the program instructions readable/executable by a processor which:
receives the password for the user account while the user inputs the password in a password field of a login page, wherein the password comprises a plurality of characters;
converts the password from a plain text to a hash value, wherein a hash function is used to convert the password from the plain text to the hash value;
performs a modulo operation on the hash value to obtain an index pointing to an object within an object library associated with the user, wherein the object library is one of a contact list and an image library, and wherein the object in the object library is at least one of a contact name, a contact image, a contact number, an email address and an image; and
displays the object in real time as the hint in accordance with a real time mapping between the index obtained for the hash value and the object within the object library, wherein the hint enables the user to create an association between the password and the object for the user account.

18. The computer program product according to claim 17, wherein the program instructions further cause the processor to insert a username for the user account and a service provider ID for the user account in an enrolled list.

19. The computer program product according to claim 17, wherein the program instructions further cause the processor to:
create a new index for a new object added to the object library;

tag an index of a deleted object as a deleted entry; and
alter an index of an altered object based on a request to alter the index of the altered object within the object library.

\* \* \* \* \*